United States Patent [19]

Laggy et al.

[11] 3,740,484

[45] June 19, 1973

[54] CALL DISTRIBUTING SYSTEM

[75] Inventors: William Joseph Laggy, Middletown; Harold Frederick May, Holmdel, both of N.J.

[73] Assignee: Bell Telephone Laboratories, Incorporated, Murray Hill, N.J.

[22] Filed: Sept. 21, 1971

[21] Appl. No.: 182,364

[52] U.S. Cl....... 179/18 J, 179/15 AT, 179/18 AF, 179/27 D

[51] Int. Cl............................................. H04j 3/00

[58] Field of Search.................. 179/15 AT, 18 AF, 179/18 ES, 18 J, 27 D, 27 DB, 1 B

[56] References Cited

UNITED STATES PATENTS

| | | | |
|---|---|---|---|
| 3,105,878 | 10/1963 | Frankel | 179/18 J |
| 3,244,813 | 4/1966 | Schreiner | 179/18 J |
| 3,479,466 | 11/1969 | Damiano | 179/18 ES |
| 2,953,749 | 9/1960 | Beeslee | 179/18 J |

*Primary Examiner*—Kathleen H. Claffy
*Assistant Examiner*—David L. Stewart
*Attorney*—R. J. Guenther and James Warren Falk

[57] ABSTRACT

A time division call distributing system for connecting trunks to operator positions is disclosed. The system includes a four-wire time division bus, with each trunk and position being assigned a permanent time slot in the transmit direction. A trunk requesting connection to a position activates a two-stage lockout circuit which enables the requesting trunk and an idle position. When a trunk and position are enabled, they transmit to each other over an identity bus, a pulse in their respective permanently assigned transmit time slots. These pulses are utilized to store, in the trunk and the position circuits, time slot information for the receive direction.

20 Claims, 11 Drawing Figures

CALL DISTRIBUTING SYSTEM

BACKGROUND OF THE INVENTION

This invention relates to communications systems and, more particularly, to expandable automatic call distributing systems operating on a time division basis.

A call distributing system is a telephone switching system for distributing calls, placed to a common number, among a plurality of terminating circuits. Such a system may be used, for example, to connect a telephone subscriber on a trunk with a directory assistance operator at a position or to connect a department store customer with one of the many information operators of the department store. It would appear advantageous to have an expandable call distributing system which is efficient and economical over a range of sizes. In the past, most call distributing systems have been of the common control variety. However, a common control call distributing system is most economical for a fixed size system and is not readily and efficiently expandable over a broad range of sizes.

A common prior art technique for providing for system expansion is to design the system in modular fashion with a minimum amount of common equipment and the control logic distributed among the modules. If the system were to utilize time division switching, certain economies could be realized because, for example, a single set of transmission buses could be physically threaded through all the modules as the system is expanded. However, in the prior art, time division switching has not readily lent itself to the distribution of control logic because there has to be some way of assigning a unique common time slot to both ends of a connection. It would therefore appear to be advantageous to provide some way in which a time division system could be modularly expanded with a corresponding distribution of logic.

SUMMARY OF THE INVENTION

In accordance with principles illustrative of this invention, an automatic call distributor that is easily expandable with respect to the number of trunks and positions served is provided. Switching between trunks and positions is accomplished on a time division basis and the logic for controlling the switching is distributed among the trunk and position circuits. In order to control the assignment of time slots without having a common control, each trunk and position is permanently assigned a time slot for use in the transmit direction. When it is desired to establish a connection between a particular trunk and operator's position, the trunk and position exchange time slot information. This exchanged information is then utilized by the trunk and position in the respective receive direction. In order to expand the number of trunks and positions served by the system above the number of available time slots, additional time division transmission buses are provided and, along with the exchange of time slot information, the trunks and positions also exchange information as to their respective assigned transmission buses.

In order to control the connections between incoming trunks requesting connection and available positions, a two-stage lockout circuit arrangement is provided. Each trunk circuit contains a lockout circuit. All the trunk lockout circuits are connected to a common service request detector in such a way that only one trunk at a time can activate the service request detector. The position circuits likewise each contain a lockout circuit but these position lockout circuits are connected together in a hunting arrangement activated by the service request detector. Therefore, when an incoming trunk requests connection to a position, the lockout circuits of only one trunk and one position are activated. The activation of the lockout circuits enables the transfer of time slot information between the trunk and position.

DESCRIPTION OF THE DRAWING

The foregoing will be more readily understood upon a reading of the following description in conjunction with the drawing in which.

GENERAL DESCRIPTION

Figure 1:
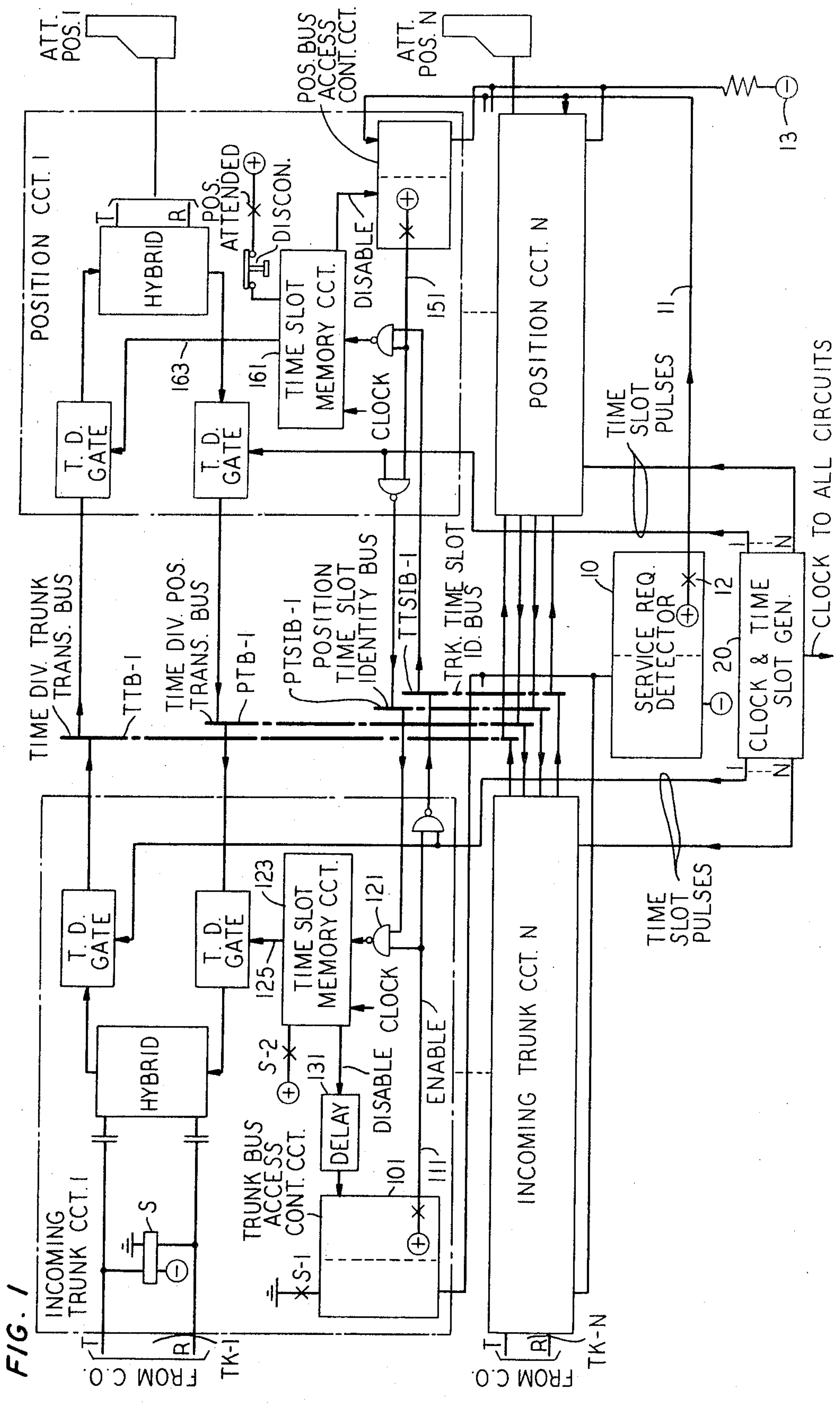
FIG. 1 depicts a schematic block diagram of a system having a single transmission bus set and operating in accordance with the principles of this invention.

Turning now to FIG. 1, depicted therein is an illustrative automatic call distributing system utilizing time division switching for connecting trunks to positions. The common circuitry of the illustrative system comprises a pair of time division transmission buses (TTB–1, PTB–1), a pair of identity buses (TTSIB–1, PTSIB–1), a service request detector (10), and a clock and time slot generator (20). The trunk circuits are all identical, as are the position circuits, and each contains all of the control logic necessary for effecting a connection over the transmission buses between a service-requesting trunk and an available service-supplying position. Service request detector 10 functions to transmit a service request signal from a trunk to all the available positions, and clock and time slot generator 20 supplies synchronized timing information to all circuits of the system.

In a time division switching system, connections between circuit elements are effected over a common bus by connecting the elements corresponding to a given connection to the common bus during the same time slot of a repetitive cycle of distinct time slots. In a system operating in accordance with the principles of our invention, as illustratively depicted in FIG. 1, each trunk is permanently assigned a distinct time slot for transmission purposes and each position is permanently assigned a distinct time slot for transmission purposes. Therefore, two transmission buses are required, one for transmission from trunks to positions (TTB–1) and the other for transmission from positions to trunks (PTB–1). Clock and time slot generator 20 supplies to each trunk and each position a pulse in the time slot permanently assigned to the respective trunk and position as well as a series of pulses defining all of the time slots of the system, this latter series of pulses being referred to hereinafter as the system clock. From the above, it is readily apparent that there may be as many trunks and as many positions on the pair of transmission buses as there are time slots.

For the purposes of the following discussion, all details will be described with reference to incoming trunk circuit 1 and position circuit 1. When incoming trunk TK–1 is seized because a calling party is requesting a connection to an attendant at one of the positions 1 through N, supervisory relay S in incoming trunk circuit 1 is operated. The operation of relay S causes contact S–1 to close and apply ground to trunk bus access control circuit 101 in incoming trunk circuit 1. Circuit 101 will subsequently be described in greater detail but for the present purposes may be considered to comprise any well-known lockout circuit, as described, for example, in Chapter 15 of the book *The Design of Switching Circuits* by Keister, Ritchie and Washburn. The lockout circuits of all the incoming trunk circuits are tied together at service request detector 10. As is well known in the art, and as described in the aforementioned book, only one lockout circuit will operate. This insures that only one trunk sets up a connection to one of the positions at any given time. When a request for service by a trunk causes the operation of the corresponding lockout circuit, this operation is detected by detector 10. Positive battery is then applied to all position circuits over lead 11 through symbolic contact 12. This battery is applied within each position circuit to a position bus access control circuit therein. The position bus access control circuits each comprise a lockout circuit and are connected to a common negative battery 13 in a hunting configuration, as described in Chapter 16 of the aforementioned book. This configuration allows only one of the position bus access control circuits to be activated in response to the battery applied by detector 10.

Assuming that position circuit 1 is the position circuit whose lockout circuit is activated when incoming trunk circuit 1 requested service, battery is applied to lead 151 in position circuit 1. When incoming trunk circuit 1 requested service and trunk bus access control circuit 101 was activated, battery was applied to lead 111 in incoming trunk circuit 1. The application of battery to leads 111 and 151 by the respective bus access control circuits in the incoming trunk circuit and the position circuit effects a transfer of identity information between incoming trunk circuit 1 and position circuit 1. This transfer takes the form of a pulse over the trunk time slot identity bus TTSIB–1 from incoming trunk circuit 1 to position circuit 1 and a pulse over the position time slot identity bus PTSIB–1 from position circuit 1 to incoming trunk circuit 1. These pulses are in the respective permanently assigned time slots of the trunk and position and are on leads permanently wired from the clock and time slot generator to the respective trunk and position circuits. Since the only lockout circuits operated were those within incoming trunk circuit 1 and position circuit 1, these are the only trunk and position circuits which are enabled to transmit and receive over the identity buses.

The position time slot pulse transmitted over the position time slot identity bus PTSIB–1 is gated through gate 121 into time slot memory circuit 123, which had power supplied to it through contact S–2 of supervisory relay S. Time slot memory circuit 123 is arranged to receive the single pulse from gate 121 and thereafter supply pulses over lead 125 in the time slot during which the pulse on the position identity bus was received. An illustrative circuit which may be utilized as time slot memory circuit 123 is fully disclosed in our copending application, Ser. No. 182,373, filed on even date herewith. When time slot memory circuit 123 receives a pulse from gate 121, it transmits a signal to trunk bus access control circuit 101 over lead DISABLE. This signal is delayed by delay 131 and releases trunk bus access control circuit 101, in a manner to be described in more detail hereinafter. Simultaneous with the above, similar circuit actions take place in position circuit 1. The POSITION ATTENDED switch in position circuit 1 is closed when an operator is present at attendant position 1, thereby applying power to time slot memory circuit 161. As will become evident subsequently, if no power is applied to circuit 161, the position bus access control circuit is disabled, preventing position circuit 1 from responding to a service request. Therefore, if the POSITION ATTENDED switch was closed, time slot memory circuit 161 in position circuit 1 produces pulses over lead 163 in the time slot permanently assigned to incoming trunk circuit 1.

Pulses from clock and time slot generator 20 in the permanently assigned time slots are utilized by the respective trunk and position circuits to transmit signals over the respective transmission buses, and pulses produced by the time slot memory circuits of the trunk and position circuits are utilized to receive signals from the transmission buses. Since incoming trunk circuit 1 places signals on the time division trunk transmission bus TTB–1 in the same slot that position circuit 1 is receiving signals from the time division trunk transmission bus TTB–1, and similarly for the time division position transmission bus PTB–1, a time division connection is established between incoming trunk circuit 1 and position circuit 1.

In order to terminate a connection, the party on incoming trunk TK–1 may hang up. This causes supervisory relay S to be de-energized, thereby removing power from the time slot memory circuit. With power removed from the time slot memory circuit, no pulses are applied to the time division gate connected to the position transmission bus PTB–1. The attendant may likewise terminate the connection by depressing the DISCONNECT button. This depression removes power from the time slot memory circuit for a period of time sufficient to stop the generation of pulses in the time slot assigned to the trunk. After the attendant releases the DISCONNECT button, power is reapplied to the time slot memory circuit. This allows the position circuit to respond to another service request.

Turning now to FIGS. 2A through 2D, depicted therein is an expanded system of the type discussed above with reference to FIG. 1 wherein a plurality of transmission bus sets are provided. As in the system of FIG. 1, each trunk and position is permanently assigned a time slot for transmission. In addition, each trunk is assigned a bus for transmission and is connected to all the position transmission buses. Similarly, each position is assigned a bus for transmission and is connected to all the trunk transmission buses.

When an incoming trunk circuit requests connection to a position circuit, the manner of pairing an available position circuit with the incoming trunk circuit is identical to that described with reference to the system of FIG. 1. However, since each trunk circuit and each position circuit is permanently assigned to a particular transmission bus as well as a particular time slot, at the time that they transfer time slot information, the enabled trunk and position circuits also transfer to each other, over a pair of identity buses, the identity of the transmission bus to which they are respectively connected. This is accomplished by permanently wiring a bus identity cross-connect field, as illustratively depicted in FIG. 2A, to a set of gates whose outputs are connected to the respective identity bus. The permanently assigned time slot pulse is utilized to transfer the information from the bus identity Cross-connect field through the gates and onto the identity bus.

Information received by the incoming trunk circuit from the position identity bus PIB is gated into a bus selection matrix 201 which operates and locks up one of the position bus relays PB1–PBM, in a manner well known in the art. Operation of one of these latter relays causes only the position transmission bus corresponding to the enabled position circuit to be gated to the time division gate which receives pulses from the time slot memory circuit. Similar circuit actions take place in the enabled position circuit, thereby establishing a time division connection between an incoming trunk circuit and a position circuit. Termination of the connection is accomplished in the same manner as that described for the system of FIG. 1 with the addition that the bus-selecting relays are released in the trunk circuit when supervisory relay S is de-energized and in the position circuit when the DISCONNECT button is depressed.

DETAILED DESCRIPTION

Figure 3:
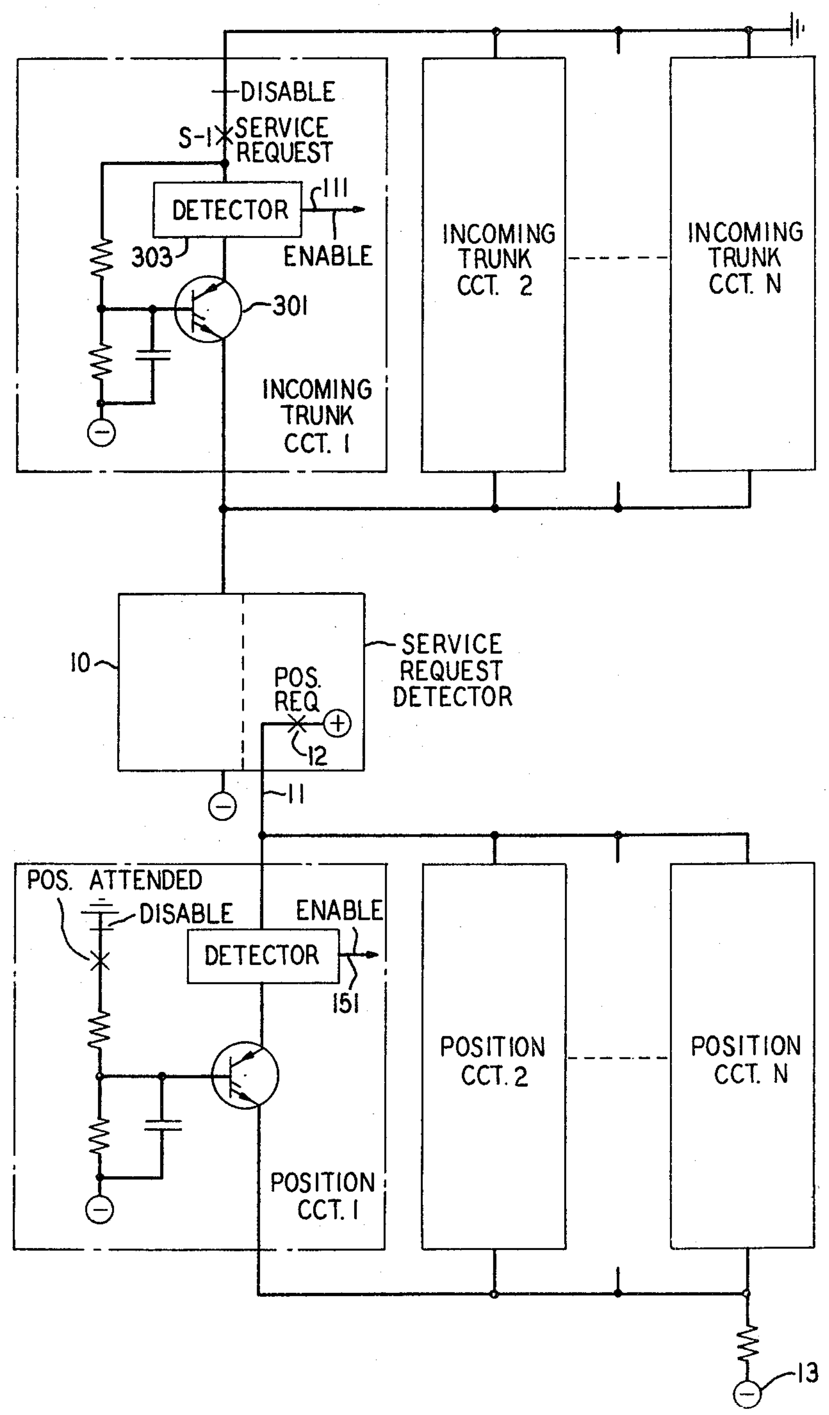
FIG. 3 depicts a schematic block diagram of the circuitry utilized in the systems of FIG. 1 and FIGS. 2A through 2D for matching a service-requesting trunk with an available service-supplying position.

FIG. 3 depicts the two stages of lockout circuitry that comprise the trunk and position bus access control circuits for the system of FIG. 1. These two stages are utilized to match a service-requesting trunk with an available service-supplying position. The general characteristics of electronic lockout circuits utilizing negative-resistance devices are well known in the art, as described in the aforementioned book by Keister, Ritchie and Washburn, and a detailed description will not be given herein.

If incoming trunk circuit 1 requests a connection to an available position, with symbolic contact DISABLE closed, the closure of contact S–1 of supervisory relay S causes PNPN device 301 to conduct, resulting in a current flow through detector 303. Detector 303 senses this current flow and transmits an ENABLE signal over head 111, as will be described subsequently in greater detail. The foregoing has assumed that none of the other trunks has requested a connection. Since all of the incoming trunk circuits contain identical lockout circuitry connected as shown in FIG. 3, as is well known in the art only one of the lockout circuits will be activated upon a simultaneous closure of the corresponding supervisory relays, thereby allowing only one detector to generate an ENABLE signal.

The operation of a lockout circuit in an incoming trunk circuit will be detected by service request detector 10, in a manner to be described in detail hereinafter, causing the application of positive battery to lead 11 through symbolic POSITION REQUEST switch 12. When battery is applied to lead 11, only one of the position lockout circuits whose DISABLE and POSITION ATTENDED switches are closed will operate, in a manner well known in the art. Assuming that position circuit 1 is the position circuit whose lockout circuit operates, an ENABLE signal is transmitted over lead 151. The ENABLE signals on lead 111 in incoming trunk circuit 1 and on lead 151 in position circuit 1 allow the transfer of time slot information between incoming trunk circuit 1 and position circuit 1, thereby setting up a time division connection between these two circuits, as described hereinbefore. After the time slot memory circuits in the trunk and position circuits have stored time slot information for the receive direction, the symbolic DISABLE contacts in the trunk and position circuits are opened, removing the lockout circuits from operation and allowing the remaining lockout circuits to compete for connections.

Figure 2A:
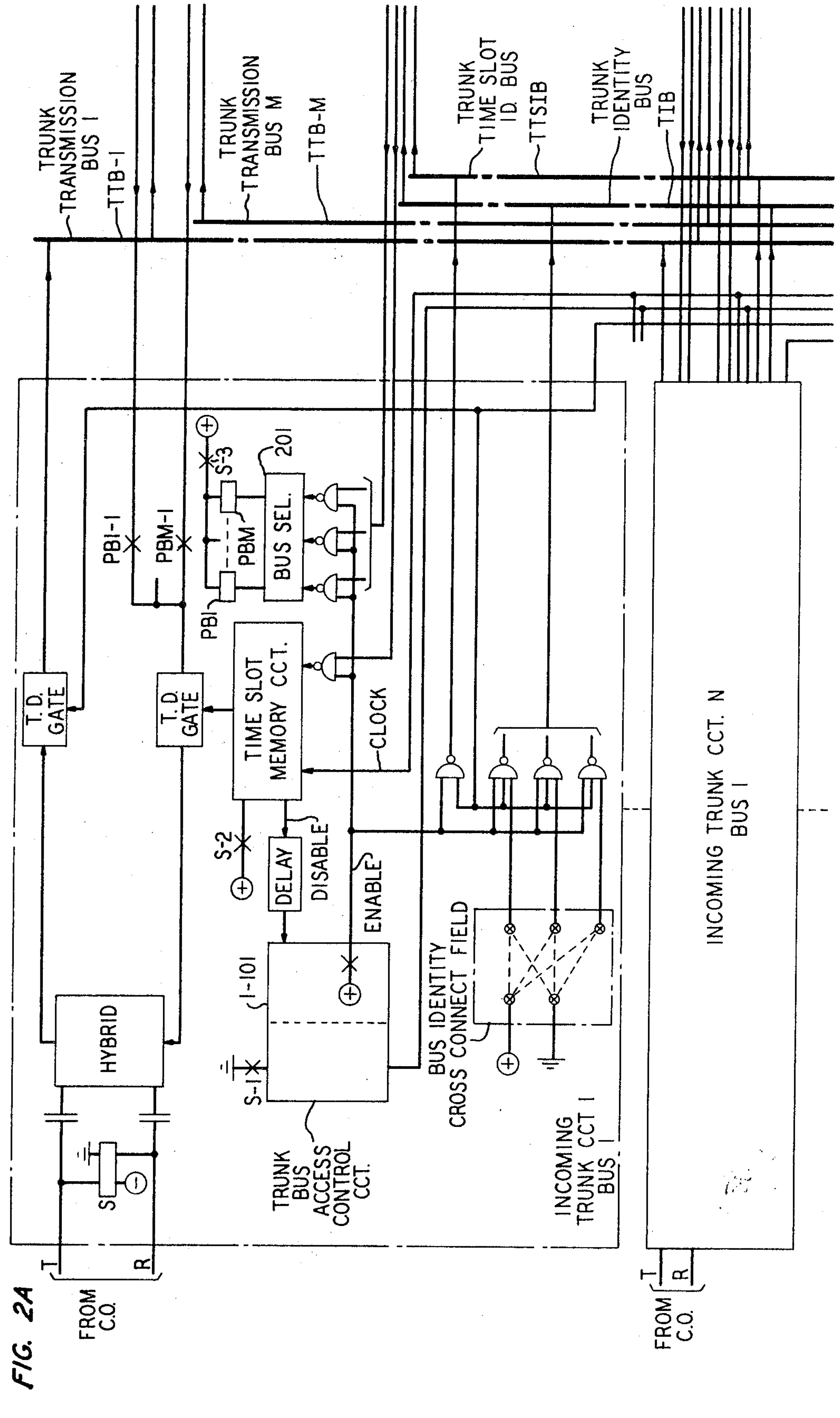
FIGS. 2A through 2D, when arranged as shown in FIG. 5, depict a schematic block diagram of a system having a plurality of transmission bus sets and operating in accordance with the principles of this invention.
Figure 2B:
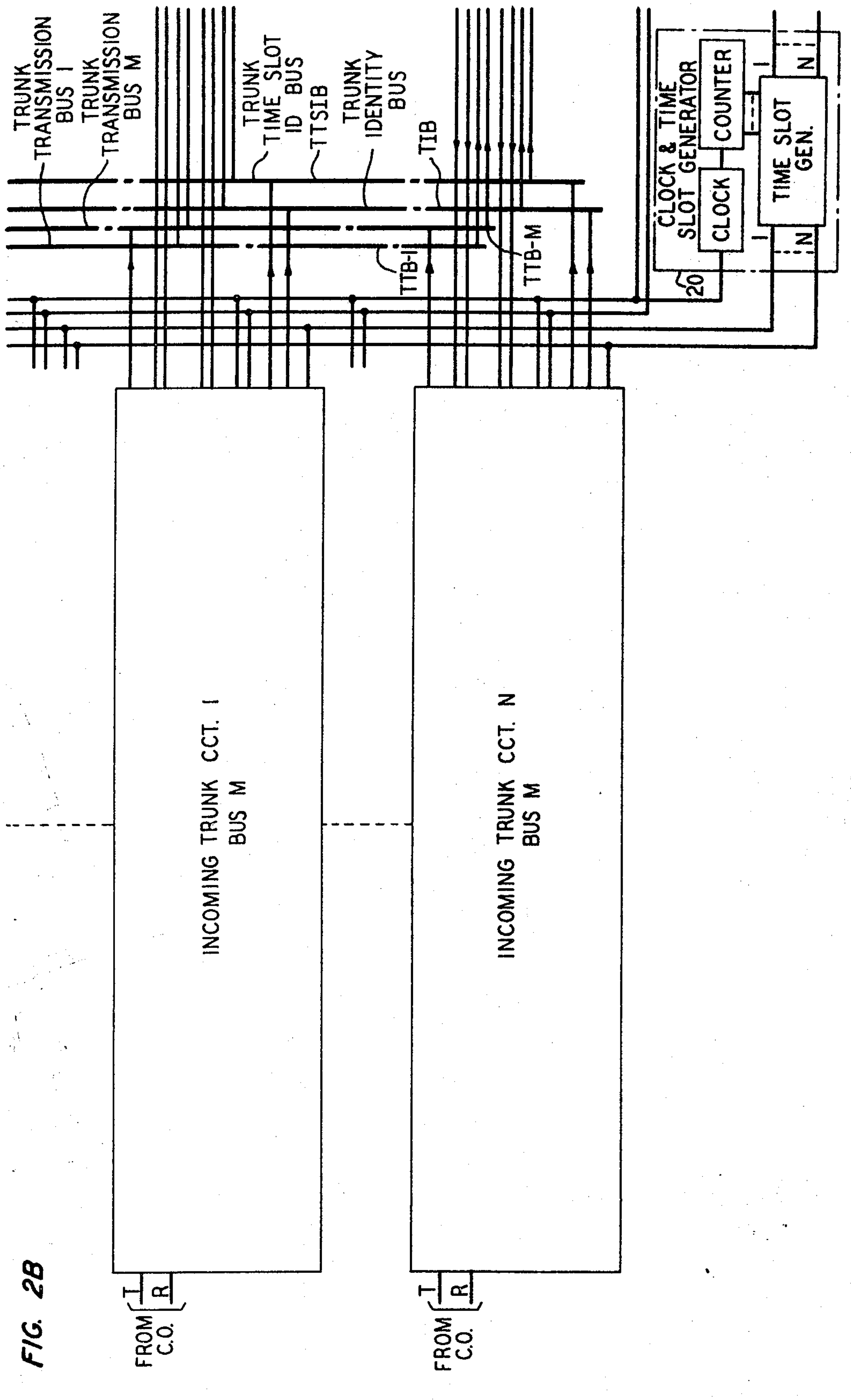
Figure 2C:
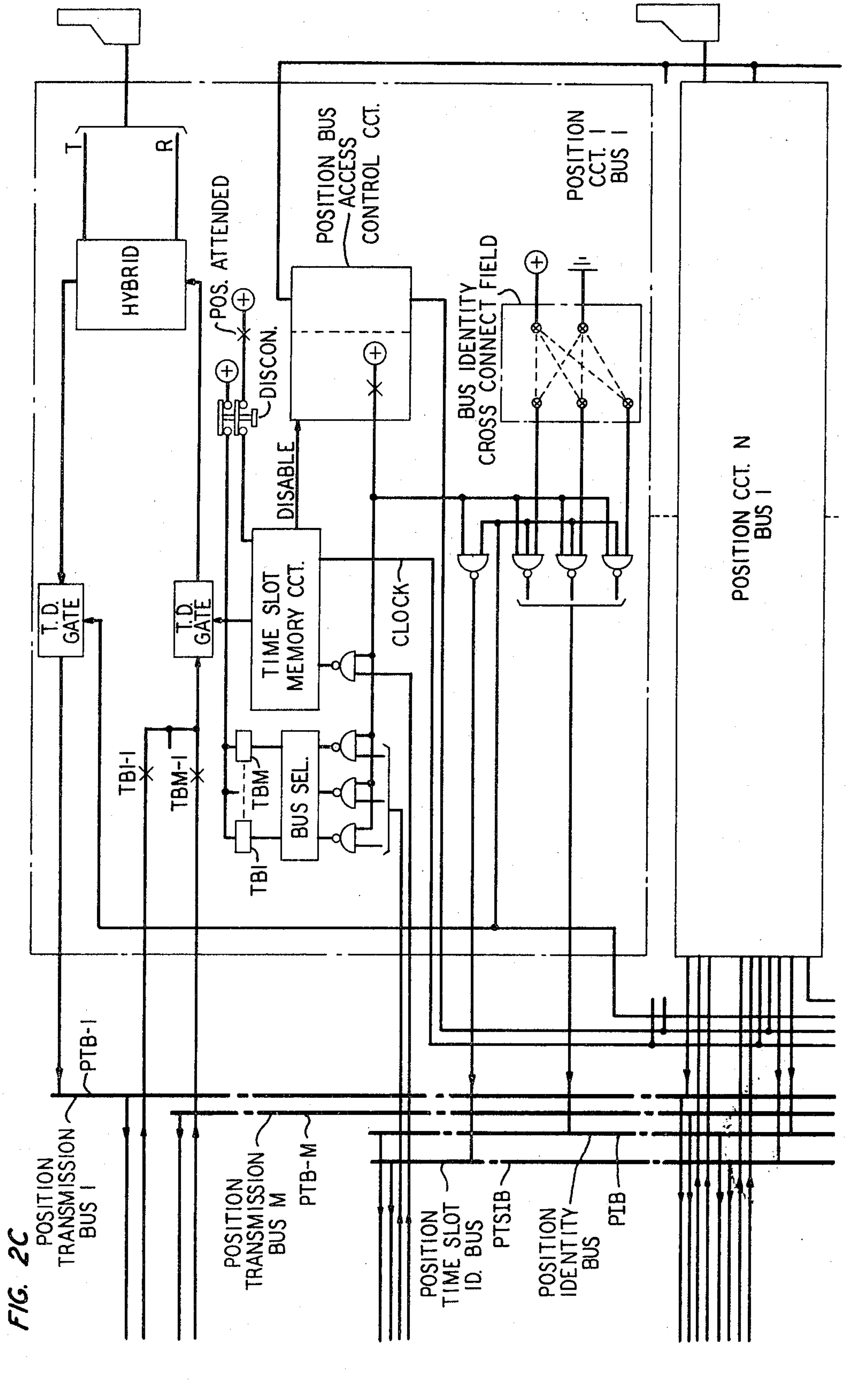
Figures 2D, 5, 6:
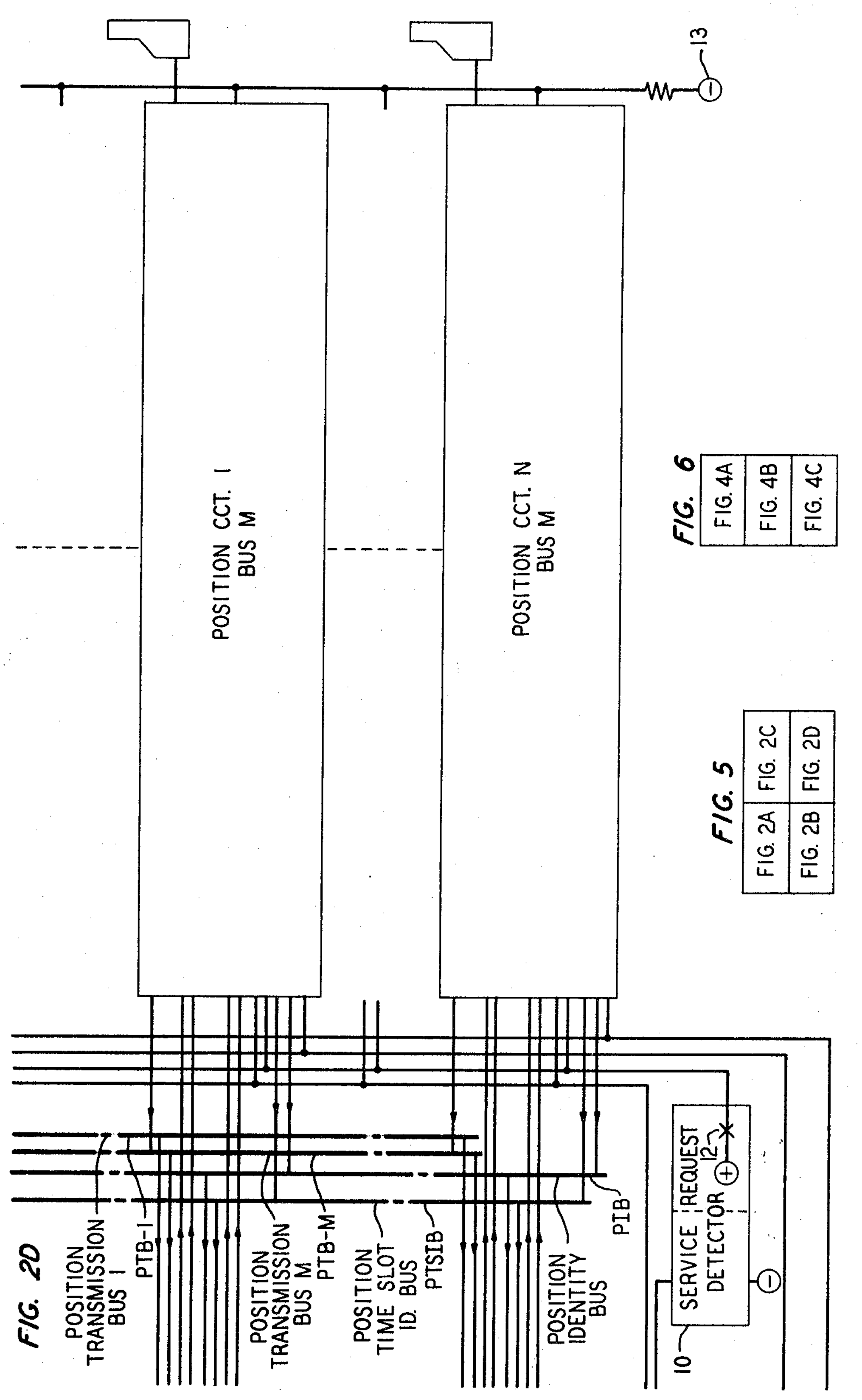
Figure 4A:
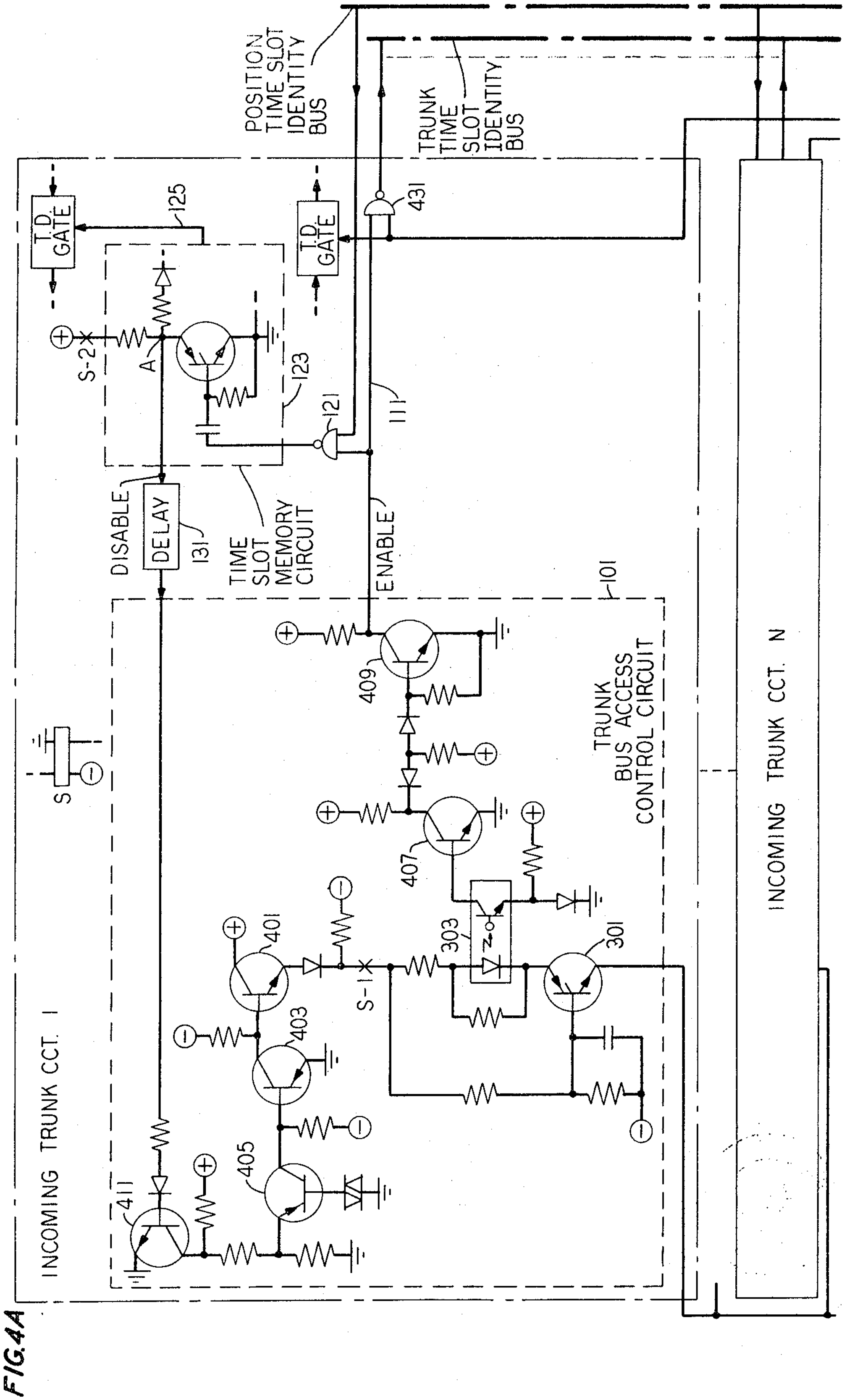
FIGS. 4A through 4C, when arranged as shown in FIG. 6, depict a more detailed schematic diagram of the circuit of FIG. 3 showing the interconnection of the circuit elements of FIG. 3 with the circuit elements of the system of FIG. 1.
Figure 4B:
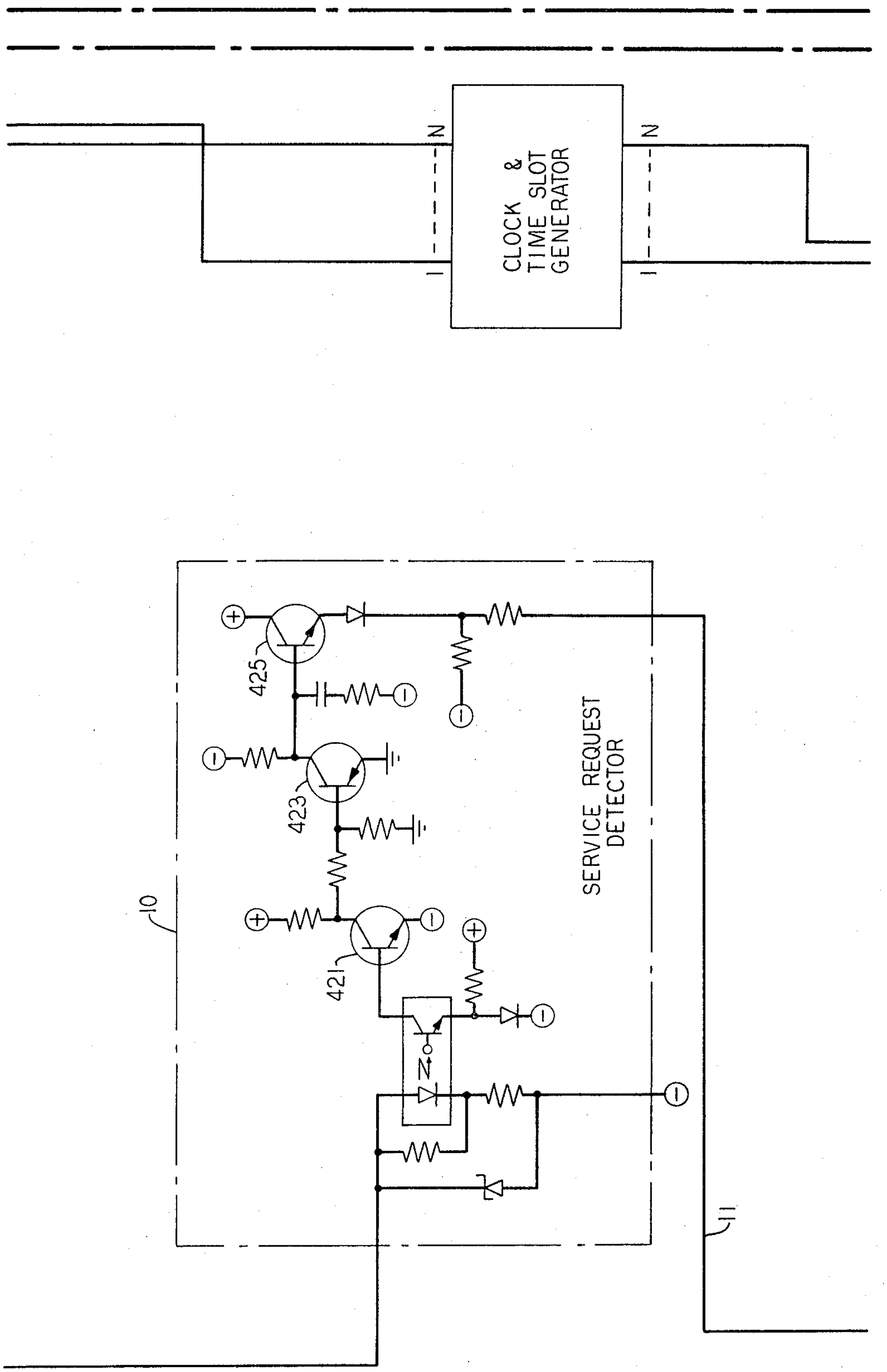
Figure 4C:
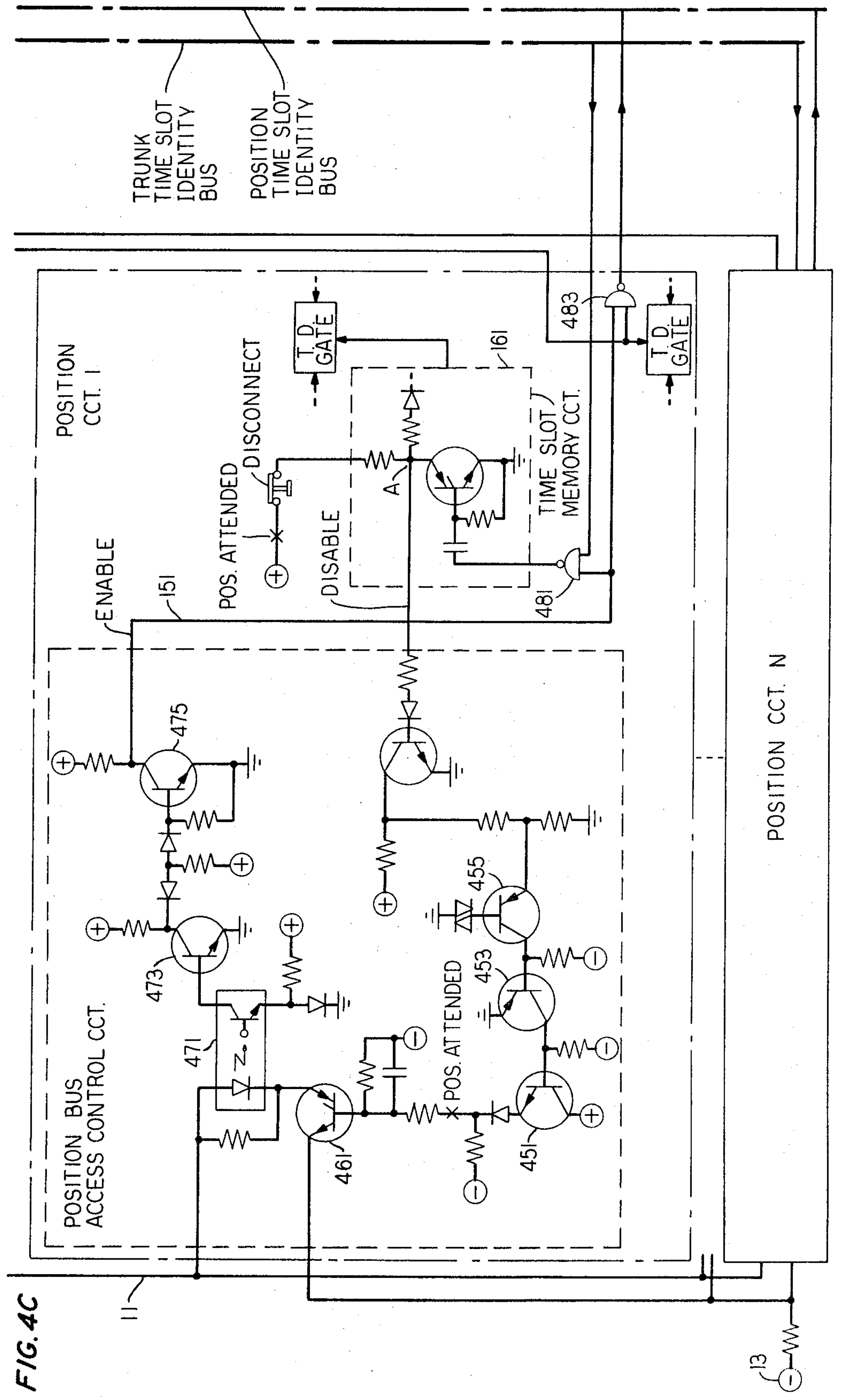

FIGS. 4A through 4C, when arranged as shown in FIG. 6, depict a detailed circuit diagram of the trunk and position bus access control circuits for the system of FIG. 1 and the interconnection of these circuits with the other elements of the system of FIG. 1. Transistors 401, 403 and 405 together, FIG. 4A, and transistors 451, 453 and 455 together, FIG. 4C, represent the normally closed symbolic contacts DISABLE in FIG. 3. Initially, transistors 401, 403, 451 and 453 are on and transistors 405 and 455 are off. When supervisory relay S in incoming trunk circuit 1 is operated, contact S–1 closes and completes a series circuit to PNPN device 301. This causes PNPN device 301 to break down and allow current to flow through detector 303 and service request detector 10. Detector 303 is illustratively chosen to be a photon-coupled semiconductor device which has been called, among other names, an opto-electronic amplifier or a photon-coupled isolator. This choice is based upon considerations of switching speeds. In its simplest form, this semiconductor device consists of a gallium arsenide diode which emits light when current passes through it. The stream of photons emitted is proportional to the magnitude of the current through the diode. The photons are optically coupled to a photo-transistor, the current through which varies in accordance with the intensity of the impinging light which strikes the base region.

With current flowing through detector 303 and service request detector 10, transistors 407 (FIG. 4A) and 421 (FIG. 4B) are turned on. With transistor 407 on, transistor 409 turns off, thereby enabling gate 121. With transistor 421 on, transistors 423 and 425 are turned on. Transistor 425 represents the symbolic POSITION REQUEST switch 12 in FIG. 3. When transistor 425 turns on, positive battery is applied to all the position bus access control circuits (FIG. 4C).

Assuming that position circuit 1 is attended and is idle, it is further assumed that PNPN device 461 (FIG. 4C) breaks down, rather than a corresponding PNPN device in another position circuit. This will cause current to flow through detector 471, turning on transistor 473 and turning off transistor 475. With transistor 475 off, gates 481 and 483 are enabled. When the position time slot pulse occurs, it is then transmitted through gate 483 onto the position time slot identity bus. Gate 121 in incoming trunk circuit 1 (FIG. 4A) is the only enabled gate of all the corresponding gates in the incoming trunk circuits which are connected to the position time slot identity bus. Therefore, time slot memory circuit 123 is the only trunk time slot memory circuit which receives an input pulse. As disclosed in the aforementioned copending application, when an incoming pulse in a time slot is received by time slot memory circuit 123, point A drops to ground potential. This change to ground potential is delayed by delay 131 and turns off transistor 411. Transistor 411 turning off turns on transistor 405 and turns off transistors 401 and 403, thereby removing power from PNPN device 301. Similar circuit actions take place in position circuit 1 after time slot memory circuit 161 receives the trunk transmit time slot which was transmitted over the trunk time slot identity bus from gate 431 through gate 481. At this point in time, the time slot memory circuits have stored therein the transmit time slot of the opposite member of the desired connection, and the respective bus access control circuits have been disabled, allowing other trunks and positions to compete for connections. In the incoming trunk circuit, the reason for delaying the DISABLE signal through delay 131 is to insure that under worst-case conditions the time slots are stored in both the time slot memory circuits.

When the connection is to be terminated, supervisory relay S in incoming trunk circuit 1 is de-energized, removing power from time slot memory circuit 123. This causes the potential at point A to float away from ground, thereby turning on transistor 411, turning off transistor 405 and turning on transistors 403 and 401, closing the symbolic contact DISABLE. Similarly, when the attendant depresses the DISCONNECT button, this will cause the symbolic DISABLE contact in the position bus access control circuit to close, thereby readying position circuit 1 to compete for another incoming call.

Accordingly, there has been described a modular time division call distributing system which is readily expandable. It is understood that the above-described arrangement is merely illustrative of the application of the principles of our invention. Numerous other arrangements may be devised by those skilled in the art without departing from the spirit and scope of our invention.

What is claimed is:

1. A time division call distributing system including four-wire time division bus means for connecting trunks to operator positions, means for permanently associating each of said trunks and said positions with an individual time slot for transmitting over said bus means, and means including a further pair of bus means independent of said four-wire time division bus means for transmitting from said trunks to said positions and from said positions to said trunks respective time slot information to be used for receiving over said four-wire time division bus means.

2. A time division call distributing system in which any of a plurality of trunks may request a connection to any of a plurality of operator positions comprising a first transmission bus for transmitting signals from said trunks to said positions, a second transmission bus for transmitting signals from said positions to said trunks, a time slot generator for generating pulses defining distinct time slots of a repetitive cycle, means for distributing said pulses to said trunks and said positions so as to uniquely associate each of said trunks with a different one of said time slots and to also uniquely associate each of said positions with a different one of said time slots, means responsive to a connection request signal from a trunk for selecting an idle position, and time slot identity means responsive to a position selection by said selecting means for transmitting to the requesting trunk a pulse in the time slot associated with the selected position and for transmitting to the selected position a pulse in the time slot associated with the requesting trunk, said selecting means including a plurality of trunk lockout circuits each associated with one of said trunks for generating said connection request signal and arranged so that only one of said trunk lockout circuits can generate said connection request signal at any given time.

3. The system of claim 2 wherein each of said trunks includes detector means associated with the associated trunk lockout circuit and responsive to the generation of said connection request signal by the associated trunk lockout circuit for generating an output signal, means responsive to said output signal for receiving said selected position time slot pulse from said time slot identity means, and a time slot memory circuit responsive to the reception of said selected position time slot pulse for thereafter generating pulses in said selected position time slot.

4. The system of claim 3 wherein each of said trunks further includes means responsive to said output signal and the reception of said selected position time slot pulse for disabling the associated trunk lockout circuit.

5. The system of claim 3 wherein each of said trunks further includes means utilizing the time slot pulses distributed to said each trunk for transmitting signals from each trunk over said first transmission bus, and means responsive to said output signal for utilizing said pulses generated by said time slot memory circuit to receive signals from said second transmission bus.

6. The system of claim 2 wherein said selecting means further includes a plurality of position lockout circuits each associated with one of said positions, said plurality of position lockout circuits being connected together so that only one of said position lockout circuits operates in response to said connection request signal.

7. The system of claim 6 wherein each of said positions includes detector means associated with the associated position lockout circuit and responsive to the operation of the associated position lockout circuit for generating an output signal, means responsive to said output signal for receiving said requesting trunk time slot pulse from said time slot identity means, and a time slot memory circuit responsive to the reception of said requesting trunk time slot pulse for thereafter generating pulses in said requesting trunk time slot.

8. The system of claim 7 wherein each of said positions further includes means responsive to said output signal and the reception of said requesting trunk time slot pulse for disabling the associated position lockout circuit.

9. The system of claim 7 wherein each of said positions further includes means utilizing the time slot pulses distributed to said each position for transmitting signals from each position over said second transmission bus, and means responsive to said output signal for utilizing said pulses generated by said time slot memory circuit to receive signals from said first transmission bus.

10. A time division call distributing system in which any of a plurality of trunks may request a connection to any of a plurality of operator positions comprising a first plurality of transmission buses for transmitting signals from said trunks to said positions, each individual one of said trunks being connected to only one of said first plurality of transmission buses, a second plurality of transmission buses for transmitting signals from said positions to said trunks, each individual one of said positions being connected to only one of said second plurality of transmission buses, a time slot generator for generating pulses defining distinct time slots of a repetitive cycle, means for distributing said pulses to said trunks and said positions so as to uniquely associate each of said trunks on each bus of said first plurality of transmission buses with a different one of said time slots and to also uniquely associate each of said positions on each bus of said second plurality of transmission buses with a different one of said time slots, means responsive to a connection request signal from a trunk for selecting an idle position, and identifying means responsive to a position selection by said selecting means for transmitting to the requesting trunk a pulse in the time slot associated with the selected position and position bus identity signals identifying to which bus of said second plurality of transmission buses said selected position is connected and for transmitting to said selected position a pulse in the time slot associated with the requesting trunk and trunk bus identity signals identifying to which bus of said first plurality of transmission buses said requesting trunk is connected, said selecting means including a plurality of trunk lockout circuits each associated with one of said trunks for generating said connection request signal, said plurality of trunk lockout circuits being connected together so that only one of said trunk lockout circuits can generate said connection request signal at any given time.

11. The system of claim 10 wherein each of said trunks includes detector means associated with the associated trunk lockout circuit and responsive to the generation of said connection request signal by the associated trunk lockout circuit for generating an output signal, means responsive to said output signal for receiving said selected position time slot pulse from said identifying means, a time slot memory circuit responsive to the reception of said selected position time slot pulse for thereafter generating pulses in said selected position time slot, and means responsive to said output signal for receiving said position bus identity signals from said identifying means.

12. The system of claim 11 wherein each of said trunks further includes means responsive to said output signal and the reception of said selected position time slot pulse for disabling the associated trunk lockout circuit.

13. The system of claim 11 wherein each of said trunks further includes means utilizing the time slot pulses distributed to said each trunk for transmitting signals from said each trunk over the one of said first plurality of transmission buses to which said each trunk is connected, and means responsive to said output signal for utilizing said pulses generated by said time slot memory circuit and said position bus identity signals to receive signals from the one of said second plurality of transmission buses to which said selected position is connected.

14. The system of claim 10 wherein said selecting means further includes a plurality of position lockout circuits each associated with one of said positions and arranged so that only one of said position lockout circuits operates in response to said connection request signal.

15. The system of claim 14 wherein each of said positions includes detector means associated with the associated position lockout circuit and responsive to the operation of the associated position lockout circuit for generating an output signal, means responsive to said output signal for receiving said requesting trunk time slot pulse from said identifying means, a time slot memory circuit responsive to the reception of said requesting trunk time slot pulse for thereafter generating pulses in said requesting trunk time slot, and means responsive to said output signal for receiving said trunk bus identity signals from said identifying means.

16. The system of claim 15 wherein each of said positions further includes means responsive to said output signal and the reception of said requesting trunk time slot pulse for disabling the associated position lockout circuit.

17. The system of claim 15 wherein each of said positions further includes means utilizing the time slot pulses distributed to said each position for transmitting signals from said each position over the one of said second plurality of transmission buses to which said each position is connected, and means responsive to said output signal for utilizing said pulses generated by said time slot memory circuit and said trunk bus identity signals to receive signals from the one of said first plurality of transmission buses to which said requesting bus is connected.

18. A time division switching system comprising a plurality of first communication paths and a plurality of second communication paths, a first time division multiplex transmission means for transmitting signals from said first communication parts to said second communication paths in time slot uniquely associated with each of said first communication paths, a second time division multiplex transmission means for transmitting signals from said second communication paths to said first communication paths in time slots uniquely associated with each of said second communication paths, a first time slot identity bus, a second time slot identity bus, and means including said first time slot identity bus for transmitting to said first time division multiplex transmission means the identity of the second communication paths to be connected to said first communication paths and including said second time slot identity bus for transmitting to said second time division multiplex transmission means the identity of the first communication paths to be connected to said second communication paths.

19. A time division switching system in accordance with claim 18 wherein said last-mentioned means includes means for transmitting a pulse in the time slot uniquely associated with each said second communication path to said first time slot identity bus and for transmitting a pulse in the time slot uniquely associated with each said first communication path to said second time slot identity bus.

20. A time division switching system in accordance with claim 19 wherein there are a plurality of first time division multiplex transmission means and a plurality of second time division multiplex transmission means, further comprising a first communication path identity bus and a second communication path identity bus.

* * * * *